Figure 1:
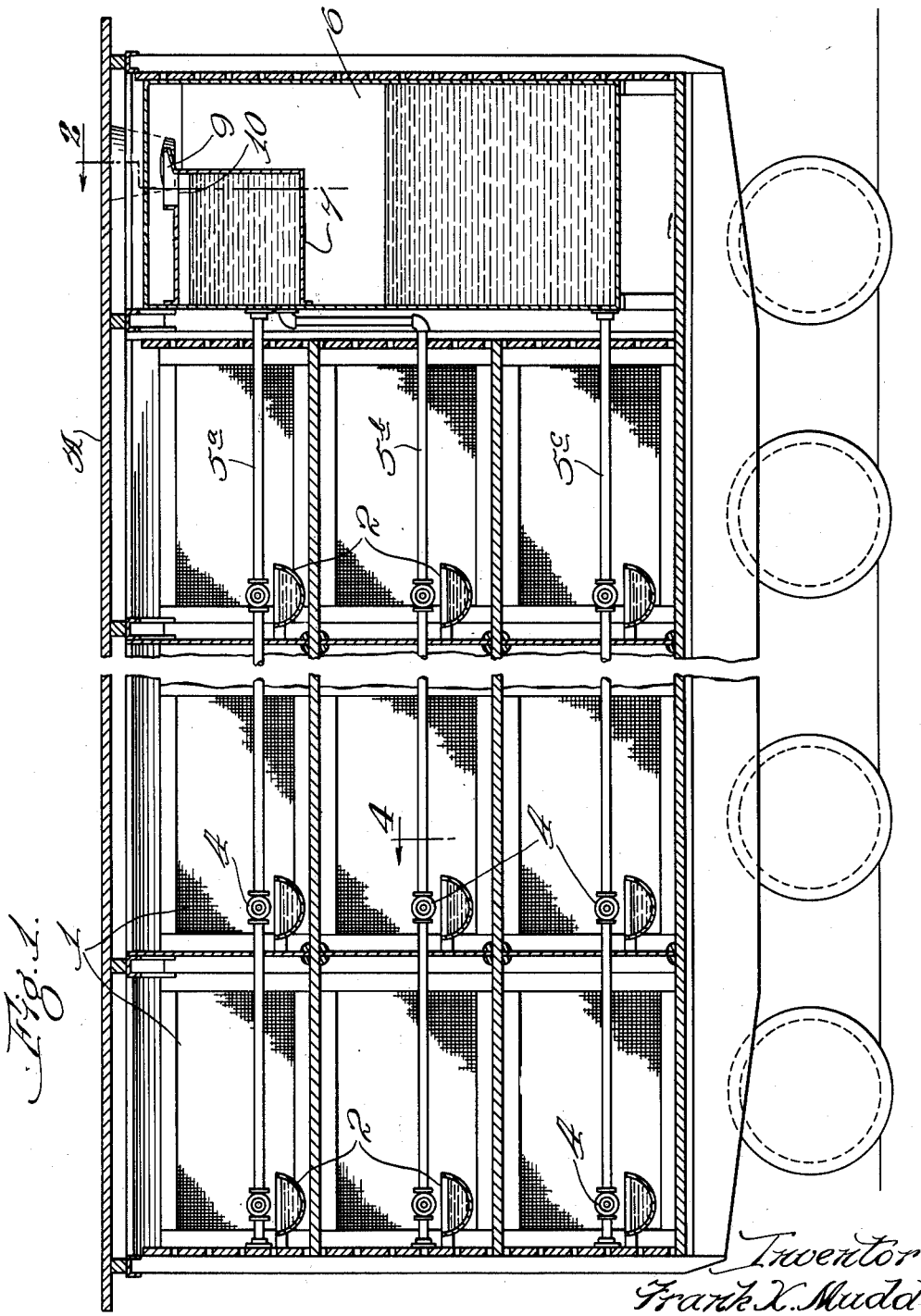

June 6, 1933.  F. X. MUDD  1,913,243
POULTRY CAR
Filed Nov. 21, 1932   2 Sheets-Sheet 1

Inventor:
Frank X. Mudd.
By Dyrenforth, Lee, Chritton and Wiles.
Attys.

June 6, 1933.   F. X. MUDD   1,913,243
POULTRY CAR
Filed Nov. 21, 1932   2 Sheets-Sheet 2
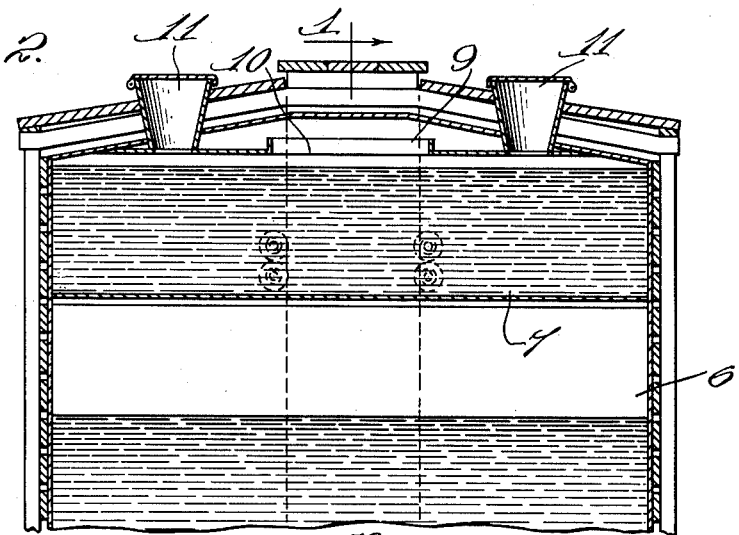
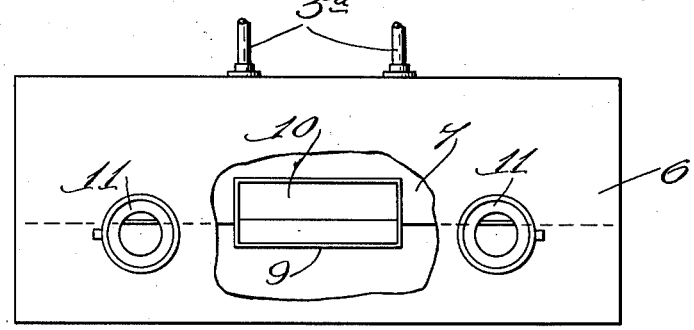
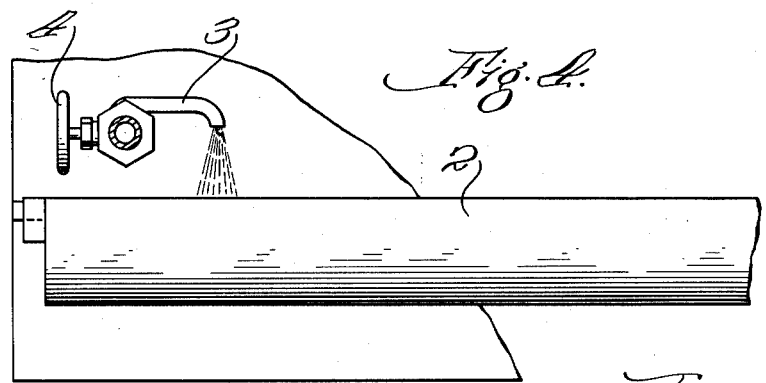

Patented June 6, 1933

1,913,243

UNITED STATES PATENT OFFICE

FRANK X. MUDD, OF CHICAGO, ILLINOIS

POULTRY CAR

Application filed November 21, 1932. Serial No. 643,725.

This invention relates to improvements in poultry cars and particularly to an improved method and apparatus for supplying water to the upper tiers of poultry coops in such cars.

Poultry cars are provided with a plurality of vertically arranged tiers of coops. It has heretofore been the practice to provide such cars with a central water supply system, consisting of a tank at one end of the car, such tank extending approximately from the top to the bottom of the car, and having water connections leading to the various tiers of coops. The coops are provided with water troughs which are supplied from pipes leading from the tanks, either through hand-operated or automatic valves. Such a system has the defect that as the water level in the tank falls, the top tiers of coops cannot be supplied with water by gravity, but the attendant in charge of the car must fill the upper troughs with a pail, which is extremely difficult.

This difficulty has been overcome by this invention, which is illustrated in the accompanying drawings, wherein Fig. 1 shows a vertical lengthwise broken section of a poultry car taken along the line 1 in Fig. 2; Fig. 2 is a vertical transverse broken section taken along the line 2 in Fig. 1; Fig. 3 is a top view of the tank partly broken away, and Fig. 4 is a broken elevation of one of the individual troughs, showing the arrangement of the faucet the plane upon which said elevation is taken is indicated by the line 4 in Fig. 1.

In the drawings A represents a typical poultry car containing a plurality of tiers of coops 1 which are supplied with water troughs 2. The troughs are filled from the faucets 3 which are controlled by the hand-operated valves 4 on the pipes $5^a$, $5^b$ and $5^c$. The pipe $5^c$ is fed from the centrally located tank 6. The pipes $5^a$ and $5^b$ are fed from the auxiliary tank 7 which is connected to the main tank 6 by means of the pan 9 and the opening therein 10. The pan 9 is shown in flat form, having its openings 10 of relatively small area. The pan may be funnel-shaped if desired. The auxiliary tank is preferably located within the main tank, and is located at such height as to supply the upper tiers of coops by gravity flow.

The tanks are filled through the openings 11 which extend through the roof of the car. These openings are so arranged that as shown in Figs. 1 and 3 proportionately, the water is divided so as to fill the main tank and the auxiliary tank at about the same rate. Any excess in the large or small tank, however, will be equailzed either through the opening 10 or the openings in the vents 11.

As the level in the auxiliary tank 7 falls, through use of the water, the tank is supplied with additional water through splashing and sloshing of water in the tank 6, due to motion of the train. This splash water is caught by pan 9 and runs into the auxiliary tank through the opening 10. The openings in the auxiliary tank may be trapped if desired in order to prevent splashing out of the water in such tank. However, the arrangement of the pan 9 should normally be sufficient without such trapping.

The faucets on the lines $5^a$, $5^b$ and $5^c$ should have their outlets arranged so that water is taken from the top of the pipe, thereby preventing clogging of these openings by settling.

In practice the large tank generally holds about 327 gallons and it is preferred to make the smaller tank about one-eighth of this, or about 41 gallons.

The foregoing detailed description has been given for clearness of understanding only, and no unnecessary limitations should be understood therefrom, but the appended claims should be construed as broadly as permissible, in view of the prior art.

I claim:

1. The method of maintaining a water supply sufficient to supply the upper tiers of coops in a poultry car or the like, which comprises trapping the water splashed upwardly by movement of said car and maintaining said upwardly splashed water at a level sufficiently high to supply said upper tiers.

2. In a poultry car or the like, having a plurality of vertically arranged tiers of coops and having means connected to a centrally located tank for supplying water to the lower tiers of said coops, an auxiliary tank connected to said first tank, at a level sufficiently high to supply water to the upper tiers of said coops by gravity flow, means connecting said tanks whereby water splashed upwardly upon movement of said car is trapped in said auxiliary tank, and means connected to said auxiliary tank for supplying water to the upper tiers of said coops.

3. Apparatus as set forth in claim 2 in which said auxiliary tank is located within an upper portion of said first tank.

4. Apparatus as set forth in claim 2 in which said auxiliary tank is located within an upper portion of said first tank, and in which said means connecting said tanks comprises a pan upon said auxiliary tank having a relatively small opening into said auxiliary tank.

5. In a poultry car having vertically arranged tiers of coops, means for supplying water to the tiers comprising a tank substantially corresponding in height to the height of the combined tiers, a second tank maintained slightly above the level of the upper tiers of coops, means for supplying water to the lower tiers from said first tank, means for supplying water to said upper tiers from said upper tank and means connecting said first and second tanks whereby water splashed upwardly upon movement of said car is caught and trapped in said second tank.

FRANK X. MUDD.